United States Patent [19]

Inoue

[11] Patent Number: 4,496,436
[45] Date of Patent: Jan. 29, 1985

[54] PULSE ELECTRODEPOSITING METHOD

[75] Inventor: Kiyoshi Inoue, Tokyo, Japan

[73] Assignee: Inoue-Japax Research Incorporated, Yokohama, Japan

[21] Appl. No.: 973,608

[22] Filed: Dec. 27, 1978

Related U.S. Application Data

[63] Continuation of Ser. No. 828,902, Aug. 29, 1977, abandoned.

[30] Foreign Application Priority Data

| Sep. 1, 1976 | [JP] | Japan | 51-104724 |
| Dec. 14, 1976 | [JP] | Japan | 51-150051 |
| Jun. 10, 1977 | [JP] | Japan | 52-69129 |

[51] Int. Cl.³ .............................................. C25D 5/18
[52] U.S. Cl. .................................... 204/23; 204/45.1; 204/49; 204/52 R; 204/DIG. 9
[58] Field of Search .............. 204/DIG. 9, 49, 52 R, 204/45 R, 23

[56] References Cited

U.S. PATENT DOCUMENTS

| 2,726,202 | 12/1955 | Rockafellow | 204/50 R |
| 3,959,088 | 5/1976 | Sullivan | 204/14 R |
| 4,049,507 | 9/1977 | Tokumoto et al. | 204/DIG. 9 X |

FOREIGN PATENT DOCUMENTS

| 1421984 | 11/1968 | Fed. Rep. of Germany . |
| 2061225 | 9/1971 | Fed. Rep. of Germany . |
| 2134401 | 12/1972 | France . |
| 12823 | 7/1963 | Japan . |
| 8801 | 5/1965 | Japan . |
| 5529 | 2/1973 | Japan . |

OTHER PUBLICATIONS

V. A. Lamb, Plating, vol. 56, No. 8, pp. 909-913, (1969).
A. Kenneth Graham, "Electroplating Engineering Handbook", pp. 573-574, (1955).
W. A. Wesley et al., Reprint from 36th Annual Proc., Am. Electroplaters Soc., pp. 79-91, (1949).
C. C. Wan et al., Plating, pp. 559-564, Jun. 1974.
Heinz W. Dettner et al., "Handbuch der Galvano-Technik", vol. 1, Part 1, p. 135, (1963).
W. Sullivan, Plating, vol. 62, No. 2, pp. 139-141, (1975).

Primary Examiner—G. L. Kaplan
Attorney, Agent, or Firm—Karl F. Ross; Herbert Dubno

[57] ABSTRACT

Electrodeposition is carried out using an electric current which is applied in the form of pulses between a workpiece and an electrode in an electrolyte from which metal is to be deposited upon the workpiece. The pulses have a pulse duration not greater than 100 microseconds and the pulse duration is preferably between 1-50 microseconds while the off time or interval between adjacent pulses is more than twice as long as the on time of the pulses.

8 Claims, 9 Drawing Figures

PULSE ELECTRODEPOSITING METHOD

This is a continuation of application Ser. No. 828,902, filed Aug. 29, 1977 and now abandoned.

The present invention relates to an improved method of electrodeposition and an apparatus for carrying out the method.

There has become known in the art a pulse depositing method in which an electric current in the form of a series of pulses is passed between a substrate or workpiece and an electrode spacedly juxtaposed therewith in the presence of an electrolyte. Such pulse depositing techniques are described, for example, in Japanese Patent Specifications No. 40-8801 published May 8, 1965 and No. 48-5529 published Feb. 17, 1973. As noted therein, pulse depositing is advantageous in that it enables an efficient ion-control in the depositing electrolyte which permits the deposition process to be achieved at an increased rate and precision. These effects are further enhanced when the liquid electrolyte is supplied so as to pass through the depositing zone at an elevated flow rate, thereby permitting the deposition to be carried out at an increased current density.

The pulse duration of pulses used heretofore in the pulse depositing process is relatively long because of the use of a power supply of commercial output frequency and no practical recognition has been made of the criticality of the pulse on-time, off-time and/or frequency.

This invention is based upon the discovery that improved deposition results are obtained when parameters of pulses are selected in certain ranges. The electrodeposition on surfaces even of a deep recess is thereby achieved with a uniformity, which has heretofore been possible only by electroless or chemical plating techniques requiring a relatively long period of time.

In accordance with the present invention, there is provided a method of electrodeposition in which an electric current in the form of pulses is applied between a workpiece and an electrode juxtaposed therewith in the presence of a liquid electrolyte to form an electrolytically deposited layer on the workpiece, the pulses having a pulse duration not greater than 100 microseconds.

The pulse duration should preferably range between 1 and 50 microseconds. The pulse off-time should preferably be more than two times longer than the pulse on-time.

The flow rate of the electrolyte in the region of electrodeposition should preferably be in excess of 5 meters/second.

Preferably, a pulse of the reverse polarity is supplied between the adjacent pulses of the normal polarity.

An apparatus for carrying out the method according to the invention may comprise a direct-current source, a switching unit for on/off controlling the output of the direct-current source and a pulser for supplying switching control pulses to the switching unit. The direct-current source may preferably comprise a voltage stabilizing regulator.

The apparatus preferably includes means for responding to an electrical parameter representative of the condition of the electrodepositing gap between the electrode and the workpiece. Such means may be a resistor connected in series with the gap and a voltage source to detect the magnitude of the electrodepositing current passing through the gap or a resistor connected in parallel with the electrodepositing gap to detect the voltage thereacross.

The electrical signal representative of the gap condition may be used to modify the basic switching control pulses in the manner to alter a parameter of the electrodepositing current pulses, i.e. pulse on time, off time and/or amplitude, in accordance with the gap condition so that the electrodepositing operation may proceed under an optimum condition.

The electronic switch may thus include at its input or control electrodes gate means having two input terminals, one receiving basic switching control pulses fed from the pulser and the other receiving a control signal fed from the gap-condition detector means to apply modified pulses across the gap. Alternatively, the pulser may incorporate a plurality of time-constant networks determining the on-time and/or off-time of pulses and selectively actuatable in response to the gap-condition detecting means.

Certain embodiments of the invention will now be described with reference to the accompanying drawing in which.

Figure 1:
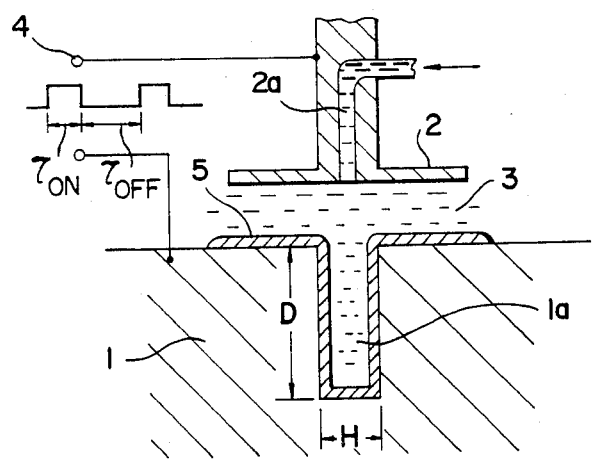
FIG. 1 is a cross-sectional view diagrammatically illustrating a pulse electrodepositing system for the purpose of explanation of the invention.

Referring now to FIG. 1, there is shown a workpiece or substrate 1 having a recess 1a of the depth D and width H to be deposited. An electrode 2 is juxtaposed with the workpiece 1 and shown having a bore and opening 2a through which a liquid electrolyte 3 is supplied to the region of the workpiece 1 by a pump (not shown) at a high flow rate. A gap spacing formed between the workpiece 1 and the electrode is generally maintained constant by a control unit as described, for example, in Japanese Patent Specification No. 38-12823 published July 22, 1963. Terminals 4 are shown which apply a series of electric pulses across the workpiece 1 and the electrode 2, the pulses having a pulse duration or on-time not greater than 100 microseconds, preferably between 1 and 50 microseconds and more preferably 1 and 10 microseconds. The pulse interval or off-time should preferably be in excess of two times longer than the pulse on-time.

Under such conditions, a uniform layer 5 is formed electrolytically for a recessed workpiece having D/H ratio as great as 10/1.

Figure 2:
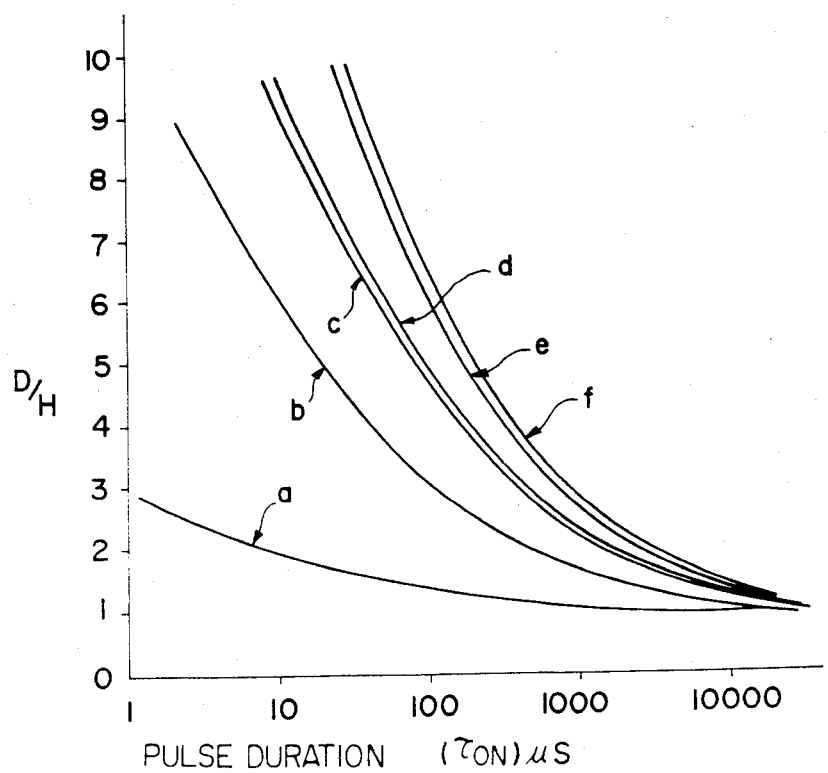
FIG. 2 is a graphical representation of experimental results of pulse electrodeposition with the use of the system of FIG. 1.

FIG. 2 shows results of experimentation in the form of a graph in which the D/H ratio of a coating obtainable is plotted along the ordinate with respect of the pulse duration or on-time $\tau_{on}$ plotted along the abscissa in microseconds. The electrolyte used was sulfonic nickel and the gap between the workpiece surface and the electrode maintained at 40 mm with a current density of 5 amperes/cm². In the graph, curves a, b, c, d, e and f are results of pulse deposition under the following conditions, respectively:

(a) Ton/Toff = ½
(b) Ton/Toff = ⅓
(c) Ton/Toff = ¼
(d) Ton/Toff = ¼ with the rate of flow of the electrolyte of 3 m/sec.
(e) Ton/Toff = ¼ with the rate of flow of the electrolyte of 5 m/sec.
(f) Ton/Toff = ¼ with the rate of flow of the electrolyte of 7 m/sec.

For each curve, it is seen that with the decrease of the pulse duration or on-time, the value D/H increases and this tendency becomes remarkable with pulses having as low a duration as 100 microseconds. It is also seen that the value D/H increases as the pulse on/off ratio is increased and when this ratio is down to less than ½, no appreciable effect is found from the use of pulses. As is noted further, the value D/H increases with longer pulse off-time for a given pulse on-time. The curves d, e and f indicate that the flushing of the electrolyte gives better results, this tendency becoming remarkable when the flow rate is increased to 5 m/sec.

Figure 3:
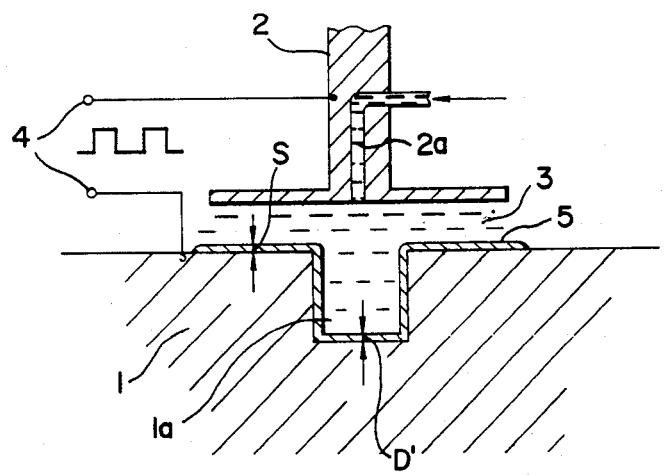
FIG. 3 is a diagrammatic cross-sectional view similar to FIG. 1.
Figure 4:
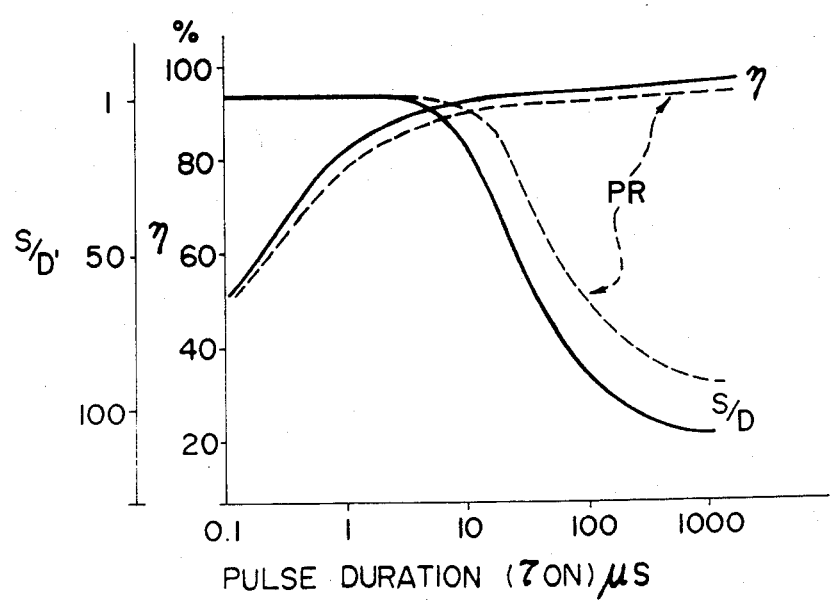
FIG. 4 is a graphical representation of additional experimental results of pulse electrodeposition.

FIG. 3 represents an embodiment of the invention similar to that of FIG. 1. With such system, tests were conducted. Workpieces had a depth of 20 mm and a width of 20 mm. The electrode 2 was positioned 10 mm apart from the workpiece 1. The electrolyte contained 220 grams/liter of CuSO₄ and 70 grams/liter of H₂SO₄ and had a temperature of 25° C. Pulses had an on/off ratio of 1/30 and a current density of 12 amperes/dm². To determine the uniformity of the electrodeposition over the entire surface, the thickness of the deposited layer on the upper surface S and the thickness of the deposited layer on the bottom of the recess D' were measured. The results are shown in FIG. 4 in the form of graphs in which the ratio S/D and the deposition efficiency η are plotted along the ordinate with respect to the pulse on-time (microseconds) plotted along the abscissa. Dotted curves represent results in the case in which a reverse-polarity pulse is interposed in each interval between successive regular-polarity pulses.

The graphs show that the ratio S/D' is approximately 1 with pulses of a duration or on-time ranging between 0.1 and 10 microseconds and sharply increases when the pulse duration or on-time exceeds 50 microseconds, making it difficult to obtain a deposition in a recess. On the other hand, the deposition efficiency is improved as the pulse duration or on-time is increased. Accordingly, best results are obtainable when a pulse duration or on-time is chosen in a range between 1 and 50 microseconds.

Figure 5:
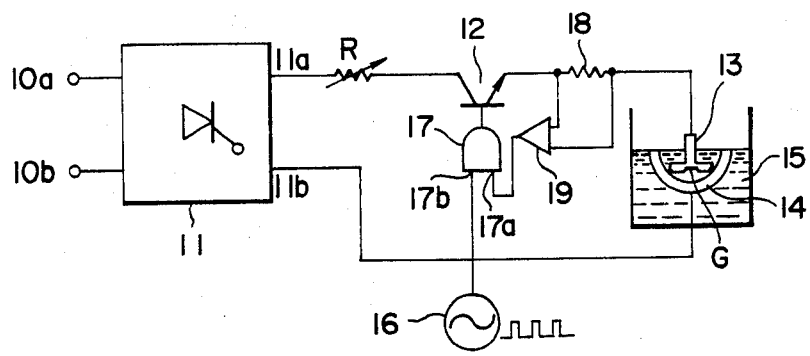
FIGS. 5 to 7 are circuit diagrams of different, preferred circuit assemblies for carrying out the method according to the invention.
Figure 6:
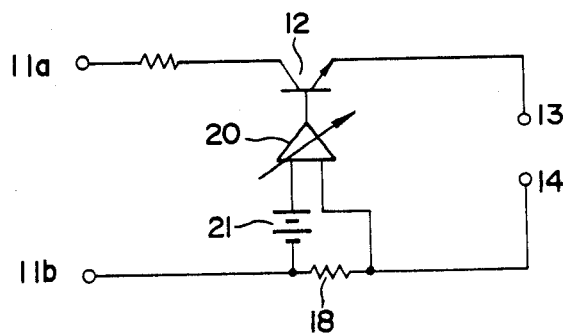
Figure 7:
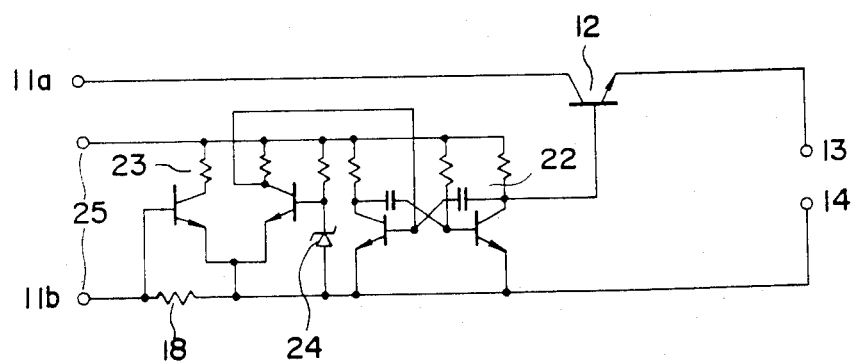

In FIGS. 5 to 7 there are shown several circuit arrangements adapted to carry out the method according to the invention and described hereinbefore.

The circuitry of FIG. 5 includes input terminals 10a and 10b fed from a commercial power source of an alternating current and a voltage regulator 11 adapted to provide across its output terminal the direct-current voltage or output of a constant amplitude. The voltage regulator 11 may be any of those known in the art and may be an arrangement described, for example, in U.S. Pat. No. 3,947,753 or in U.S. patents cited therein as references.

Connected in series with the output terminals 11a and 11b of the voltage regulator 11 are a current limiting resistor R, a switch 12 may be constituted by a transistor as shown, a thyrister or any other electronic switching element, and a depositing gap G formed by an electrode 13 and a workpiece 14 juxtaposed in a depositing bath of electrolyte 15. To cause the depositing electrolyte to forcibly flow in the region of the gap G, a pump (not shown) and conduits (not shown) for coupling it with the bath 15 may be provided.

The switch 12 is turned on and off by a pulser 16 which provides control pulses of a preset on time and off time in the ranges described hereinbefore to provide across the electrode 13 and the workpiece 14 the depositing current in the form of pulses basically of the corresponding on time and off time and of an amplitude adjusted by the resistor R.

In accordance with a specific aspect of this invention, the pulsed electrodepositing current is modified as a function of variation of the depositing condition. Thus, the amplitude, on time and/or off time of depositing pulses may be controlled as a function of the gap voltage, current and/or the impedance between the electrode 13 and the workpiece 14 subject to change in accordance with change in the electro-depositing condition.

The circuitry of FIG. 5 is designed to respond to the gap current and, to this end, is provided with a sensing resistor 18 inserted in series with the switch 12 and the electrodepositing gap G between the electrode 13 and the workpiece 14. The sensing resistor 18 has an amplifier 19 connected at its output. The output of the amplifier 19 is connected to the first input 17a of an AND gate 17 having the second input 17b which receives control pulses from the pulser 16. The amplifier 19 here has a function to discriminate the magnitude of the gap or electrodepositing current detected by the resistor 18 with respect to a preset value so that, for example, when the gap current exceeds this value, an "0" signal develops to be applied to the first input 17a to block the passage and application of control pulses from the pulser 16 to the switch 12 thereby reducing the frequency or the on/off time ratio of the pulses applied across the electrodepositing gap G. The result is the enhanced uniformity of a coating electrodeposited on the workpiece 14.

The circuitry of FIG. 6 makes use of a chopper amplifier 20 associated with a reference-voltage source 21 and a sensing resistor 18. The comparison of the reference voltage 21 with the voltage developed across the resistor 18 in response to the magnitude of the electrodepositing current passing between the electrode 13 and the workpiece causes the amplifier 10 to controllingly turn on and off the switch 12 at a variable on/off times as in the embodiment of FIG. 5. For the chopper amplifier, any of those known may be used; for example, Texas Instruments Regulating Pulse Width Modulators Types SG1524, SG2524, SG3524.

In the circuitry of FIG. 7, a multivibrator 22 of known construction is used as the pulser for applying basic switching control pulses to the switch 12. The basic switching control pulses and hence the electrodepositing current pulses determined thereby are modified as in the previous embodiments, here by a comparison network 23 which compares the reference voltage which develops across a Zener diode 24 with the voltage across the sensing resistor 8 responding to the magnitude of the electro-depositing current passing through the gap G.

Figure 8:
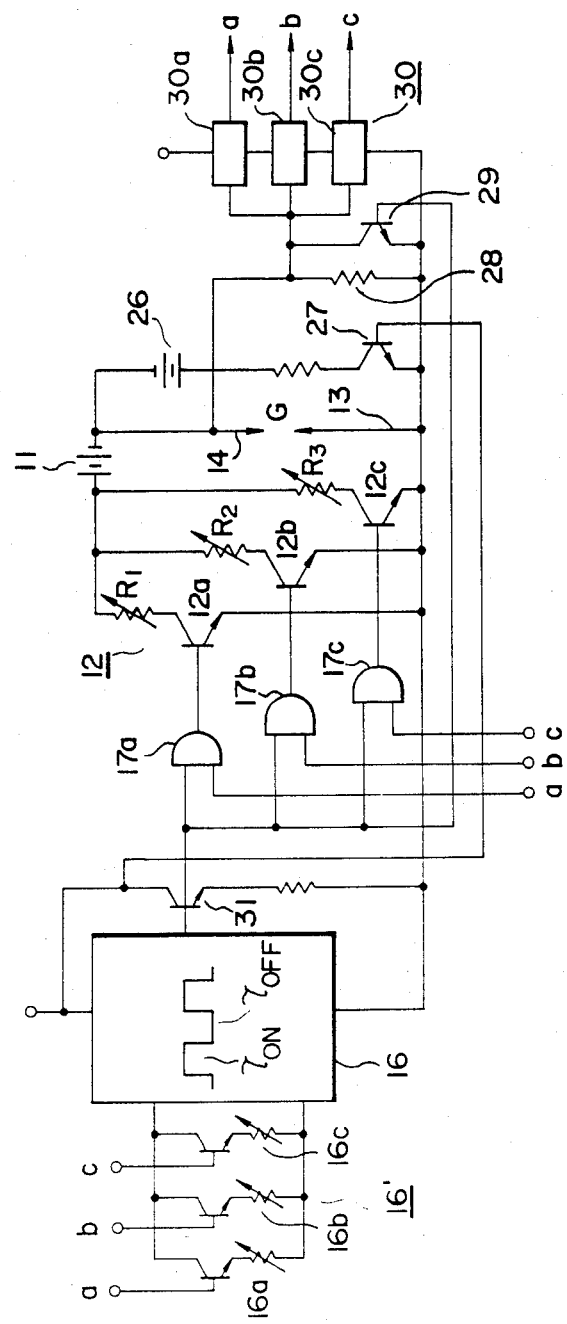
FIG. 8 is a circuit diagram of a further pulsing system embodying the present invention.

In FIG. 8 there is shown a different circuitry for carrying out the invention. In this circuit arrangement as well, the electrode 13 and the workpiece 14 forming an electrodepositing gap G therebetween are connected in series with an electronic switch 12, here shown by three transistors 13a, 13b and 13c, and a direct-current source 11. The switch 13 is turned on and off by a pulser 16 which may be a multivibrator having time-determining means 16' here constituted by three pairs of transistor and resistors 16a, 16b and 16c, connected parallel with one another and selectively actuatable. The resistance of the resistors in these pairs is set at different values so that when the network 16a is switched on, the pulse off-time of the pulser 16 has a minimum value; when the network 16c is switched on, it has a maximum value; and when the network 16b is switched on, the same has a medium value.

At the output of the pulser 16 there are provided three gates 17a, 17b and 17c for applying it to the three switching transistors 12a, 12b and 12c, respectively. These gates have each an additional input terminal a, b, c and are each enabled when the corresponding input appears. The switches 12a, 12b and 12c are further associated, respectively, in series with resistors R1, R2 and R3 having different resistances which determine tha magnitude of the current pulses applied to the gap.

In this embodiment, the series circuit of an auxiliary voltage source 26 and a transistor 27 is connected across the gap G. The transistor 27 is here designed to be tuned on and off by the phase-reversed signals of the output pulses from the pulser 16 appearing across a phase-reversing transistor 31 so that the voltage from the auxiliary source 26 which serves as a test voltage develops across the gap during each off-time of electro-depositing current pulses. The resistance or impedance during the pulse off-time is thus selectively detected at a further resistor 28 which is shunted during pulse on-time by a further transistor 29 that is switched on by the on-pulse from the pulser 16. The detecting resistor 28 is led to a discriminator unit 30 consisting of three threshold circuits 30a, 30b and 30c which may be constituted by Schmit-trigger circuits having different threshold or triggering voltage levels $V30a > V30b > V30c$ and having output terminals a, b and c, respectively.

In operation, every time the depositing current is switched off, the switch 27 is turned on to permit the test voltage from the source 26 to be applied across the gap G while the switch 29 is turned off. A voltage proportional to the gap voltage then develops across the resistor 28 and is discriminated by the discriminator 30. Thus, when the gap is under a normal condition, a "1" signal will appear at the output b to turn on the switch 16b thereby setting the pulse off-time at a predetermined, moderate value. At the same time, the "1" signal at the output b will selectively enable the gate 17b to permit the switch 12b alone to operate. The pulsed electrodepositing current will then flow which has a magnitude established by the resistor R2.

When the gap is under a high-impedance condition, a "1" signal will develop at the output a to actuate the setting channel 16a thereby setting the pulse off-time at a predetermined, decreased value established by this channel. The "1" signal at the output a will also selectively enable the gate 17a to permit the switch 12a alone to be switch-controlled. The pulsed electrodepositing current wil then flow which has an increased magnitude established by the resistor R1. A series of pulses modified when the gap is under a high-impedance condition are shown at A in FIG. 9.

When the gap is under a low-impedance condition, a "1" signal will develop at the output c to actuate the setting channel 16c thereby setting the pulse off-time at a predetermined, increased value established by this channel. Simultaneously, the "1" signal at the output c will act to selectively enable the gate 17c to permit the switch 12c alone to be triggered. The pulsed electrodepositing current will then flow which has a decreased magnitude established by the resistor R3. A series of pulses modified when the gap is under a low-impedance condition is represented at C in FIG. 9. The waveform B in the same FIGURE represents a series of pulses under a normal gap condition.

Figure 9:
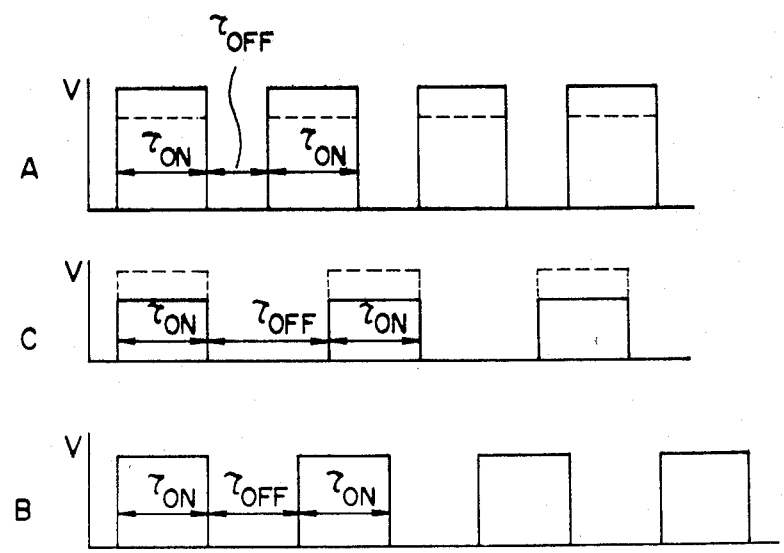
FIG. 9 is a schematic view illustrating waveforms of pulses modified in accordance with a specific aspect of the invention.

Electrodeposition of copper was conducted using a pulsing circuit arrangement as described with reference to FIGS. 8 and 9 and excellent results were obtained, for instance, with a pulse on-time of 10 microseconds and a pluse off/on time ratio of 1/1 under a normal-impedance gap condition, an increased off/on time ratio of 5/1 under a low-impedance gap condition and a decreased off/on time ratio of 0.3/1 under a high-impedance gap condition.

What is claimed is:

1. A method of electrodepositing a metal upon a workpiece from an electrolyte, said method comprising the steps of:

juxtaposing a surface of said workpiece formed with a recess having a depth D and a width H with an electrode having an electrode surface extending over the opening of said recess and disposed outside the recess;

flushing the electrolyte in the region of said electrode surface past said surfaces and through said recess; and applying an electric current poled to electrodeposit metal from said electrolyte upon said workpiece and in the recess thereof to a uniform thickness, the ratio D/H being greater than 1/1 and up to 10/1, said electric current being passed through said electrode, said electrolyte and said workpiece in the form of pulses having a pulse duration between 1 and 50 microseconds.

2. The method defined in claim 1 wherein the interval between adjacent pulses is more than twice as long as the pulse duration.

3. The method defined in claim 1, further comprising the step of interposing a reverse-polarity pulse between the successive pulses of the electrodepositing polarity.

4. The method defined in claim 1 wherein at least one parameter of the electric current is modified in response to at least one electrical parameter representing the condition of the gap between the electrode and the workpiece.

5. The method defined in claim 4 wherein said parameter of said electric current is selected from the group which consists of pulse duration, pulse interval and pulse amplitude.

6. The method defined in claim 5 wherein said gap-condition parameter is selected from the group which consists of gap current, gap voltage and gap impedance.

7. The method defined in claim 1 for the deposition of a layer on the surface surrounding said recess to a thickness S and a layer on the bottom of said recess to a thickness of D', wherein the ratio S/D' is approximately 1, the pulse duration being maintained in the range between 1 and 10 microseconds.

8. The method defined in claim 1 wherein said electrolyte is flushed in the region of electrodeposition at a flow rate in excess of 5 meters per second.

* * * * *